United States Patent [19]

Roach et al.

[11] Patent Number: 5,072,622

[45] Date of Patent: Dec. 17, 1991

[54] PIPELINE MONITORING AND LEAK CONTAINMENT SYSTEM AND APPARATUS THEREFOR

[76] Inventors: Max J. Roach; John A. Whitehead, both of P.O. Box 966, Longview, Tex. 75606

[21] Appl. No.: 532,561

[22] Filed: Jun. 4, 1990

[51] Int. Cl.⁵ .............................................. G01M 3/28
[52] U.S. Cl. .................................................. 73/40.5 R
[58] Field of Search ........................ 73/49.2, 40.5 R; 220/441, 443

[56] References Cited

U.S. PATENT DOCUMENTS

| | | | |
|---|---|---|---|
| 3,184,958 | 5/1965 | Eaton | 73/40.5 |
| 3,299,417 | 1/1967 | Sibthorpe . | |
| 3,339,415 | 9/1967 | Wild | 73/40.5 |
| 3,907,336 | 9/1975 | Siegmund | 73/40.5 R X |
| 4,321,110 | 3/1982 | Nickel et al. | 73/40.5 R X |
| 4,332,170 | 6/1982 | Belval et al. | 73/40.5 R |
| 4,386,269 | 5/1983 | Murphy | 250/227 X |
| 4,450,711 | 5/1984 | Claude | 73/40.5 X |
| 4,644,780 | 3/1987 | Jeter | 73/40.5 X |
| 4,651,893 | 3/1987 | Mooney | 73/49.2 |
| 4,667,505 | 5/1987 | Sharp | 73/40.5 X |
| 4,920,786 | 5/1990 | Danielson | 73/49.2 |

Primary Examiner—Hezron E. Williams
Assistant Examiner—Joseph W. Roskos
Attorney, Agent, or Firm—John M. Harrison

[57] ABSTRACT

This application discloses a pipe system comprising at least one lined pipe section. This lined pipe section comprises an outer pipe having an exterior wall, a thermoplastic liner having an exterior surface flush with and in tight engagement with the interior wall of the outer pipe, and at least one groove located in the exterior surface. The groove and the interior wall of the outer pipe define at least one passageway.

18 Claims, 2 Drawing Sheets

PIPELINE MONITORING AND LEAK CONTAINMENT SYSTEM AND APPARATUS THEREFOR

BACKGROUND OF THE INVENTION

This invention relates to pipelines lined with a thermoplastic liner.

Pipelines constructed of steel, iron, concrete or other such materials are susceptible to corrosion from both external and internal causes. Consequently, it is known in the art to line such pipelines with a corrosion-resistant thermoplastic liner (such as, but not limited to, polyethylene, nylon and other polyolefins) to inhibit internal corrosion or to reline existing lines that are deteriorating in areas where it would be extremely expensive to install new lines.

There are two types of liners, loose-fitting liners, where the liner itself carries the containment pressure of the fluid in the liner, and tight-fitting liners. The latter type of liners line pipes so that the liner is flush with and tightly engaged with the interior wall of the pipe. The liner therefore is physically supported by the pipe and so may depend on the strength of the pipe to carry containment pressure of the fluid in the pipeline. Tight-fitting liners are advantageous because they may be less expensive than loose-fitting liners, since they do not have to bear significant loads, and because they maintain the original pipe inner diameter to the greatest extent possible. Tight-fitting liners may also provide a double containment system since the inner liner may bridge seal any perforations or holes in the pipe resulting from corrosion or other means. Methods of lining pipes with tightly-fitting liners are known in the art. Some processes for providing tightly-fitting liners are disclosed in the following patents.

Canadian Patent 1,241,262 (Whyman and Kneller), discloses a method of installing a pipe liner of synthetic polymer in a pipe section whereby powered rollers are first used to radially deform the liner to within the elastic-plastic range of the liner. The liner in its deformed state is then inserted into a pipe section by the application of longitudinal or radial stress. The liner is then released from the stress so that it may expand radially into tight contact with the inside wall of the pipe section being lined.

U.S. Pat. No. 3,856,905 (Dawson) disclosed a process for lining a conduit with a plastic liner by radially compressing the liner at a temperature of about 100 degrees C to a diameter smaller than its original diameter without increasing the length of the liner, reducing the temperature of the liner to about room temperature, positioning the liner within the conduit, and heating the liner to a temperature of about 100 degrees C to cause radially expansion of the liner within the conduit. Longitudinal elongation of the liner is avoided by supporting the liner in a rigid frame, or, where the liner was passed through a swaging die, by operating sets of feed rollers and take up rollers at the same longitudinal speed.

U.S. Pat. No. 3,959,424 (Dawson) discloses a method of lining pipe with a thermoplastic liner which involves reducing the diameter of the liner, inserting the liner in a pipe and allowing the liner to expand by recovery within the plastic memory of the thermoplastic liner.

Canadian Patent 575,424 (Lontz et.al.) discloses lining metal pipes with fluorocarbon polymer liners by sintering a polymeric liner of larger diameter than the pipe, cooling the liner, stretching the liner to reduce its diameter to slightly less than that of the pipe, placing the liner inside the pipe, and releasing the stretching force on the liner, optionally raising its temperature at the same time.

U.S. Pat. No. 3,462,825 (Pope et.al.) discloses a process for lining a tubular member with a liner of fluorinated polymer by drawing the liner through a reduction die into the tubular member without application of heat, and releasing the liner, whereupon its expands into tight engagement with the inner wall of the member.

The problem with pipes lined with tight-fitting liners is that although the interior of the pipe is protected from corrosion by the liner, the exterior of the pipe is unprotected. If damage due to corrosion of the pipe is not repaired, the physical strength of the pipe may be seriously weakened to the point where it is unable to bear the pressure load of internal pressurized fluid within the lined pipe or of the pressure of the earth above the pipe if it is buried. The liner will therefore fail, since tight-fitting liners are generally unsuitable for bearing such loads for extended periods of time.

Failure of the liner will result in a significant replacement cost and may be catastrophic if the pipeline contains a substance that is hazardous to the environment.

Leak detection systems for dual-pipe or jacketed pipelines having an annular space between the inner and outer pipes or the inner pipe and outer jacket are known in the art. The systems are associated with the leakage into this space. Examples of such systems are disclosed in the following patents.

U.S. Pat. No. 4,667,505 (Sharp) disclosed a jacketed pipeline system whereby fluid leaked from the pipeline is contained within an annulus between the pipeline and the jacket. Leak detection in the annulus is also disclosed.

U.S. Pat. No. 4,644,780 (Jeter); U.S. Pat. No. 3,339,415 (Wild); U.S. Pat. No. 3,299,417 (Sibthrope); U.S. Pat. No. 3,184,958 (Eaton) and U.S. Pat. No. 4,450,711 (Claude) all disclose dual-containment systems having leak detections associated with the annulus between an inner and an outer pipe or sleeve.

None of the above-mentioned leak detection systems is suitable for use with tightly-lined pipe, because in a tightly-lined pipe there is no annulus between the pipe and the liner. Leakage in the liner may be teted by regularly pressure testing entire pipe-sections or by running a mobile internal pipe leakage detection device, otherwise known as a "smart pig", through the pipeline. However, these well-known methods of testing pipelines are expensive and therefore seldom used. Moreover, these methods do not adequately monitor the integrity of the outer pipe after the liner has been installed.

STATEMENT OF THE INVENTION

It is desired to provide a leakage detection system for detecting and locating holes or perforations in pipe lined with a tightly-fitting thermoplastic liner.

Accordingly, the invention provides a pipe system comprising an outer pipe having an interior wall, a thermoplastic liner having an exterior surface flush with and in tight engagement with the interior wall of said outer pipe, and at least one groove located in said exterior surface, wherein said groove and said interior wall of said outer pipe define at least one passageway.

The present invention provides at least one passageway at the interface of the interior wall of the outer pipe and the exterior surface of the liner with which a leak detector may be associated. This allows detection of leakage due to holes or perforations created by corrosion or other means in the outer pipe or due to cracks or holes in the liner. The present invention therefore provides an effective dual containment system since the integrity of both the liner and the outer pipe may be monitored.

DESCRIPTION OF THE PREFERRED EMBODIMENTS

Preferred embodiments of the invention will be described, by way of illustration only, with reference to the following drawings in which.

Figure 1:
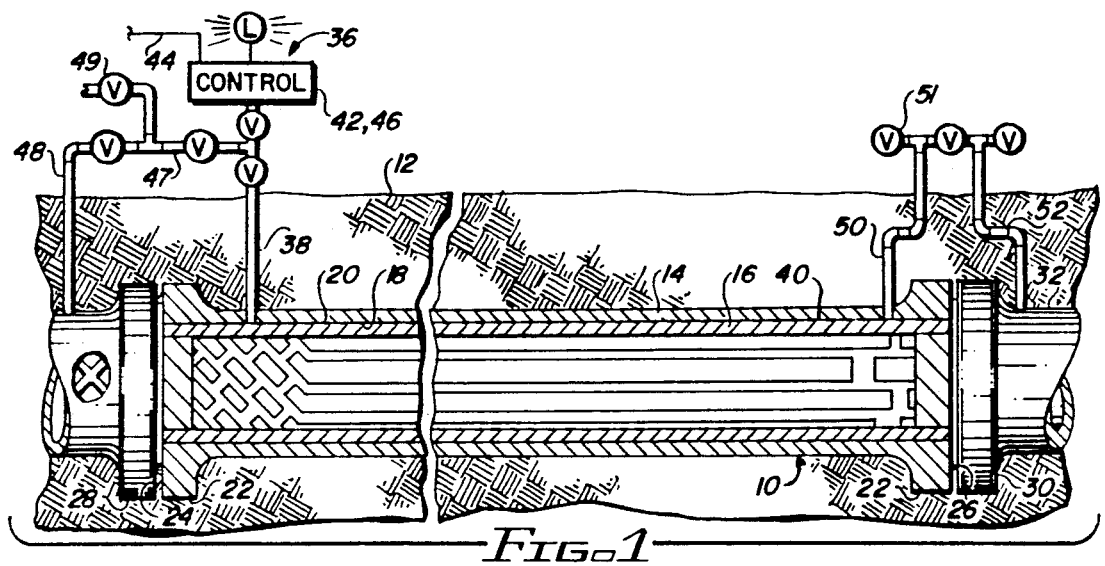
FIG. 1 is diagrammatic representation in partial cross-section of a pipe and leak detection and monitoring system.
Figure 4:
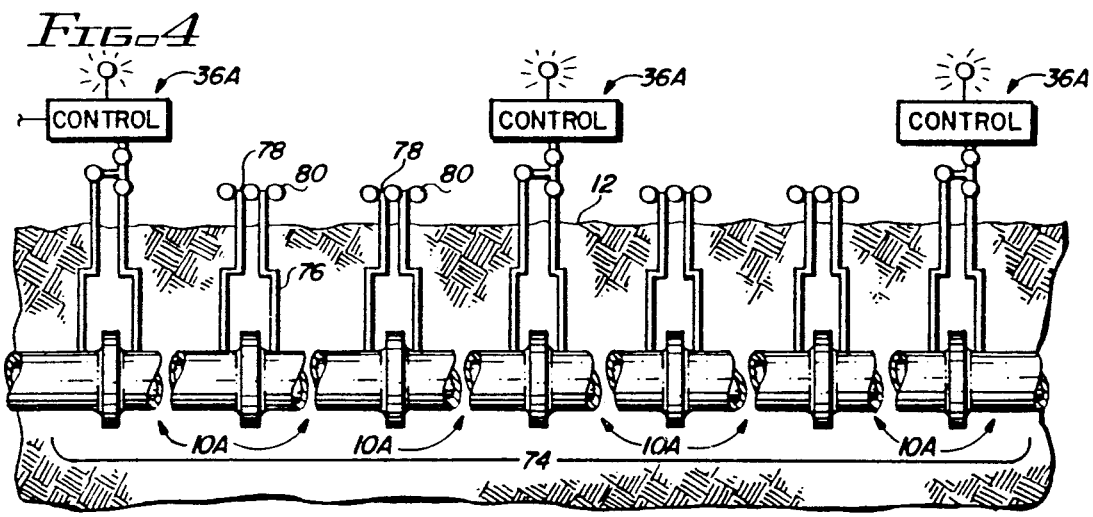
FIG. 4 is a side view of a pipeline and leak detection and monitoring system.
Figure 8:
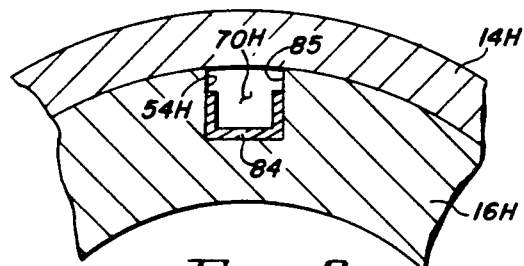
Figure 7A:
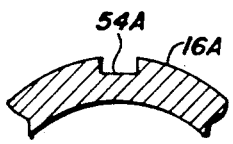
Figure 7D:
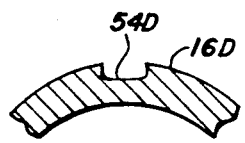
Figure 9:
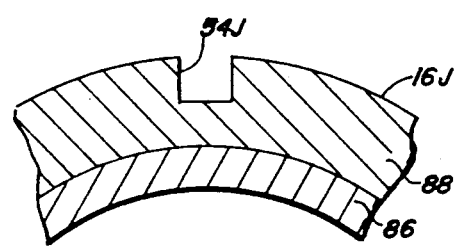
Figure 7B:
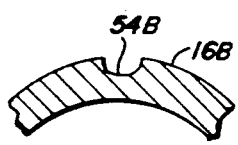
Figure 7E:
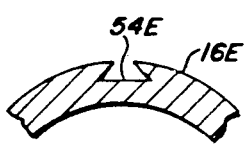
Figure 7C:
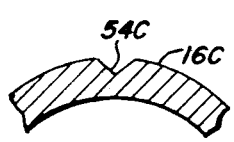
Figure 7F:
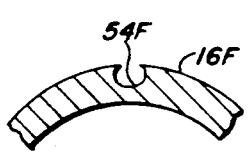
Figure 10:
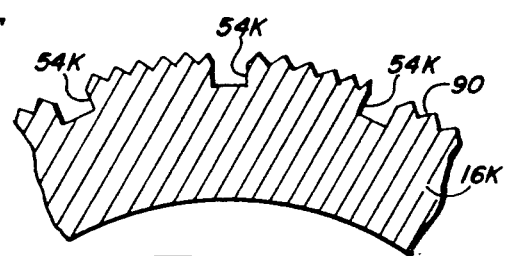

FIGS. 7A, B, C, D, E and F are cross-sectional views of a section of additional alternative liners for use in the systems of FIGS. 1 and 4;

FIG. 8 is a cross-sectional view of a section of another alternative liner for use in the systems of FIG. 1 and 4;

FIG. 9 is a cross-sectional view of a section of a further alternative liner for use in the systems of FIGS. 1 and 4; and FIG. 10 is a cross-sectional view of a section of still another alternative liner for use in the systems of FIGS. 1 and 4.

Referring to FIG. 1, it can be seen that a preferred embodiment of the invention comprises a lined pipe section 10 buried under ground 12. This lined pipe section 10 includes a steel pipe 14 and a thermoplastic liner 16. The interior wall 18 of the pipe 14 is flush with the outer wall 20 of the liner 16 and is in tight engagement therewith. A suitable method for installing the liner 16 in tight engagement with the pipe 14 is disclosed in Canadian Patent 1,241,262 (Whyman and Kneller). There are also other methods of installing said liner known to the art. Flanges 22 are provided at each of the ends 24, 26 of the lined pipe section to allow connection to a sealing flange 28 and to a flange 30 of an adjacent pipe section 32.

A riser 38 extends upwardly from the interface 40 between the pipe 14 and the liner 16 at one end 24 of the lined pipe section 18. This riser 3 is connected to a leak detection system 36. This system 36 comprises a combined monitoring and control system 42 which is in turn connected to a power source 44 and a vacuum pump(s) 46. The riser 38 is also connected to a riser 48 of the sealing flange 28 by a tube 47 having a vent tube 49 located therein. At the opposite end 26 of the lined pipe section 10, another riser 50 extends upwardly from the interface 40 between the pipe 14 and the liner 16 and is connected to a riser 52 extending from the adjacent pipe section 32 by a tube 51.

Details of the liner FIG. 1 #16 are described with reference to FIG. 2. In this figure it may be seen that the liner FIG. 1 #16 has a plurality of parallel and evenly-spaced grooves 54 extending longitudinally along a major portion of the exterior surface of the liner.

Figure 2:
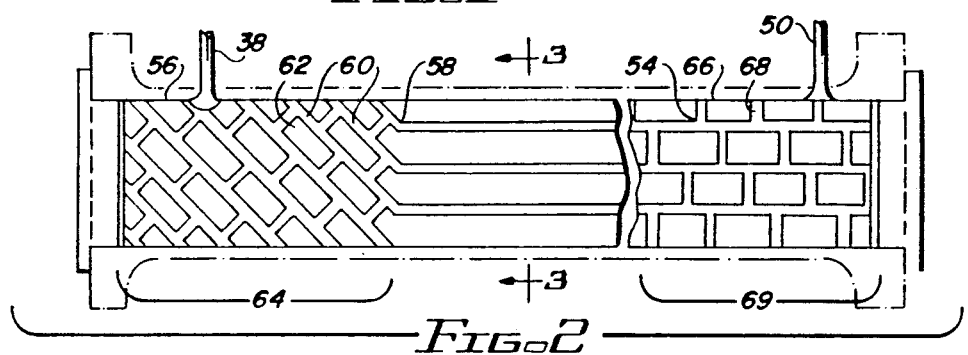
FIG. 2 is a side view of a liner for use in the pipe system of FIG. 1.
Figure 3:
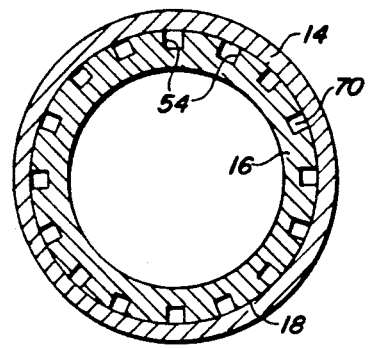
FIG. 3 is a cross-sectional view of the liner of FIG. 2 along liner 3—3 shown inserted inside a pipe; 1

FIG. 3 indicates how when the liner 16 depicted in FIG. 2 is in tight engagement with the interior wall 18 of the pipe 14, enclosed passageways 70 are defined by the grooves 54 in the liner and the interior wall 18 of the pipe 14.

Referring back to FIG. 2, it may be seen that at one end 56 of the liner, the ends 58 of the grooves communicate with helically extending grooves 60. These grooves 60 are interconnected by grooves 62 extending helically in the opposite direction. The region containing grooves 60, 62 constitutes a vacuum collection area 64 from which the riser 38 extends upwardly. The vacuum collection area 64 is connected by riser 38 to the leak detection system FIG. 1 #36 and is designed so that all of the passageways FIG. 3 #70 are in vacuum communication with the leak detection system. This particular configuration of the collection area 64 allows for the accumulation and even distribution of vacuum from or to each passageway FIG. 3 #70 defined by the grooves 54 and transfers pressure fluctuations in the passageways FIG. 3 #70 to the monitoring and control systems FIG. 1 #42. At the other end 66 of the liner, the longitudinally extending grooves 54 are interconnected by circumferentially extending grooves 68. The interconnected longitudinal grooves constitute a vacuum communication area 69, which is connected to a riser 50. This vacuum communication area 69 is designed to be connected by riser 50 to like passageways of adjacent lined pipe sections so that at least one of the passageways FIG. 3 #70 is in vacuum communication with the riser 50. The liner 16 shown in FIG. 3 may be made of a single resin with desirable physical properties to both bridge and seal a hole or leak in the outer pipe 14.

The operation of the apparatus disclosed in FIGS. 1 to 3 will now be described. A vacuum is created in the passageways FIG. 3 #70 by operation of the vacuum pump FIG. 1 #46. The level of vacuum is kept constant by means of the monitoring and control system FIG. 1 #42. This system FIG. 1 #42 also monitors fluctuations in the vacuum level in the passageways FIG. 3 #70. If a wide fluctuation occurs, indicating leakage of fluid into the passageway, the system FIG. #42 gives an indication to an operator that the lined pipe section FIG. 1 #10 needs to be repaired.

In the embodiments shown in FIGS. 4 through 10, components of the apparatus that are identical to components of the apparatus depicted in FIGS. 1 through 3 are identified by the same numeral followed by the suffixes "A" through "K".

FIG. 4 illustrates a particularly preferred embodiment of the invention in which a plurality of pipe sections 10A are interconnected to provide a pipeline 74. A plurality of leak detection systems 36A are located at intervals along the length of the pipeline. The risers 76 of adjacent lined pipe sections are connected by tubes 78 having valves 80. The risers are all in fluid communication with passageways shown at FIG. 3 #70 located within the lined pipe sections so that vacuum from one section of lined pipeline may be transferred to another. This configuration obviates the need for the location of a leak detection system at one end of every lined pipe section. A single leak detection system can thus monitor for leakage in long lengths of interconnected pipe sections. If it is desired to isolate a leak, all of the valves 80 between lined pipe sections may be closed and then individual valves can be successively opened, starting from the valve closest to the leak detection system, and vacuum level monitored until the section containing the leak or hole is located. Alternatively, a portable leak detection system may be connected to tubes 78 at different points along the length of the pipe until the leak is located.

Figure 5:
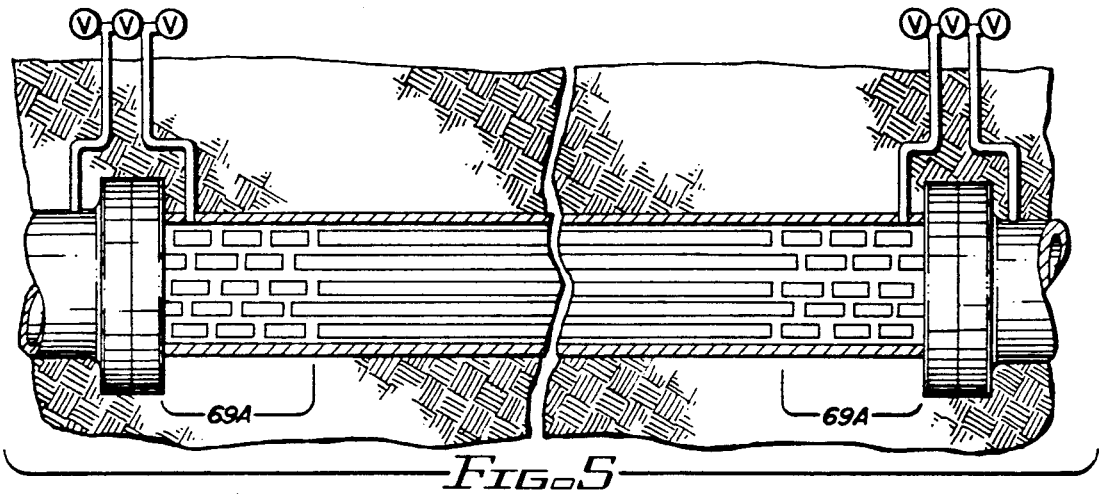
FIG. 5 is a side view of a liner for use in the pipe system of FIG. 4.

FIG. 5 shows a pipe liner suitable for use in the pipe sections in FIG. 4 #10A that are connected at each end to adjacent lined pipe sections. Both ends of the liner have vacuum communication areas 69A.

Figure 6:
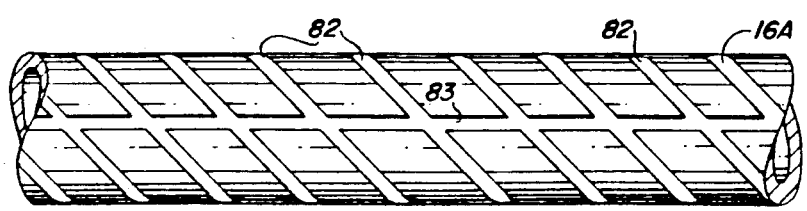
FIGS. 6 is a side view of an alternative liner for use in the systems of FIGS. 1 and 4.

FIG. 6 illustrates a liner 16A having an alternative design to be substituted for the longitudinally extending grooves of FIGS. 2 and 3 The grooves 82 in this design extend in a helical direction and are interconnected by longitudinally extending grooves 83. This design is better suited for high-pressure applications.

In a particularly preferred embodiment of the invention, it is desired that if a leak or hole in the exterior pipe FIG. 1 #14 occurs, the liner will bridge such leak or hole, and the passageways remain open long enough to give a vacuum fluctuation signal to the leak detection system FIG. 1 #36. The pipeline can be monitored by the control device FIG. 1 #42, while the liner FIG. 1 #16 bridges such hole or leak and prevents the fluid transported in the pipeline from escaping into the environment. It is then desirable for the passageways to close to seal any holes or perforations in the outer pipe until the holes or perforations can be repaired. The passageways will seal due to the pressure of the liner against the pipe and due to the containment pressure exerted by pressurized fluid in the lined pipe. This pressure will cause the thermoplastic material of the liner to creep or cold flow into the hole or perforation and thereby seal it. The rate of sealing depends on a number of factors including the property of the thermoplastic material of which the liner is made, the shape and dimensions of the groove and the containment pressure of the fluid in the pipe. In low pressure applications (i.e. 0 to 300 psi), it is desired to have grooves that facilitate the sealing of a hole in the outer pipe. Conversely, in high pressure applications (i.e. 300 to 5,000 psi) it is desired to have grooves that will withstand the high containment pressure and not seal a hole until the desired length of time to locate the leak has lapsed.

FIG. 7A, B, C, D, E, and F show alternative designs for the shape of the groove in the liner 16 A through F to achieve the above desired features. The shapes shown in FIGS. 7A, B, C and D which are Square 54A, semi-circular 54B, triangular 54C and "U"-shaped 54D respectively, are best for high pressure applications. These shapes have the greatest strength to withstand pressure and remain open at higher pipeline pressures. The shapes shown in FIGS. 7E and F, which are trapezoidal 54E and circular 54F respectively, are best suited for low pressure applications, since they have lower opening size to cross-sectional area ratios, and will more easily seal a leak or hole at low pressures.

A stiffening member 84, such as that disclosed in FIG. 8 may be inserted into the base of a groove 54H in a liner 16H to further inhibit the passageway 70H defined by the groove 54H and the pipe 14H from collapsing at higher pipeline pressures. The stiffening member does not cover the upper portion of the groove 85 and therefore allows this upper portion to eventually collapse and seal a hole or perforation in the outer pipe 14H.

FIG. 9 discloses an alternative embodiment of the invention. The liner 16J in this embodiment has an inner layer 86 of a relatively stiff, high strength polymer such as, but not limited to, high density polyethylene or nylon, and an outer layer 88 of relatively flexible polymer such as, but not limited to, low density polyethylene or lower density nylon. The groove 54J is located in the low density outer layer 88. When a hole is formed in the exterior pipe, the inner layer 86 will bridge the hole to insure that the internal shape of the liner is not substantially deformed, and the outer layer 88 will cold flow and/or creep and thereby plug the hole over a period of time.

FIG. 10 discloses another liner embodiment where the liner 16K has a plurality of shallow v-shaped recesses or profiles 90 located in the exterior surface of the liner between grooves 54K. These profiles 90 are intended to facilitate fluid communication between the grooves 54K and holes or perforations in the exterior pipe FIG. 1 #14 that are located between grooves.

The liners of the preferred embodiments of the invention may be manufactured either by extruding the required external pipe profile when manufacturing the liner or by machining grooves 54K, FIG. 7 A through F, or profiles FIG. 10 #90 on the outer surface of the liner pipe. The vacuum collection areas FIG. 2 #64 and vacuum communication areas FIG. 2 #69 may be manufactured by injection molding and fused onto the ends of the liner, or by mechanical means, such as by router. The dimensions and spacing of the grooves and profiles will depend on the pressure rating of the lined pipe and on the properties of the thermoplastic material of the liner.

Further alternative embodiments of the invention are contemplated within the scope of the invention as described and claimed. The leak detection means could comprise a pressure system instead of vacuum system. The same liner design and pipe configuration may be used as that described with respect to the vacuum detection above, except that a pump for pumping pressurized fluid into the passageways FIG. 3 #70 could be substituted for the vacuum pump FIG. #46, and the control system FIG. 1 #42 could maintain constant fluid pressure and monitor significant pressure fluctuations instead of vacuum fluctuations. The pressurized fluid could be, but is not limited to, air, nitrogen or liquid. The pressure of this fluid should be below the operating pressure of the pipeline so as not to collapse the liner.

A tracing gas such as activated or short-life radioactive gas pumped into the passageway. This gas will leak out of any may be holes or perforations in the outer pipe and may be detected by methods known in the art. Perforations or holes may thereby be located.

Alternatively, the leak detection means could be a light cable disposed in the passageways and means for detecting changes in the amount of light carried by the cable corresponding to perforations or holes in the outer pipe or inner liner. Such light cable could be laid loosely in one or more of the grooves or it could be incorporated into a groove stiffener FIG. 8 #84.

The foregoing description of the preferred embodiment of the invention has been presented for the purposes of illustration and description It is not intended to be exhaustive or to limit the invention to the precise form disclosed. Many modifications and variations are possible in light of the above description. It is intended that the scope of the invention be limited not by this detailed description, but rather by the claims appended hereto.

We claim:

1. A pipe monitoring system comprising at least one pipe having an interior wall, flexible liner means having an exterior surface substantially flush with the interior wall of said pipe, and at least one groove located in said exterior surface, wherein said groove and said interior wall of said pipe define at least one passageway and pressure differential leak detection means communicating with said at least one passageway to detect leakage into said passageway.

2. The pipe monitoring system of claim 1 wherein said pressure differential leak detection means further comprises a vacuum pump and control means communicating with said vacuum pump for maintaining a substantially constant vacuum in said passageway and monitoring significant fluctuations in the vacuum in said passageway.

3. The pipe monitoring system of claim 1 wherein said pressure differential leak detection means further comprises a pump and control means communicating with said pump for maintaining a constant fluid pressure in said passageway and monitoring significant fluctuations in the pressure in said passageway.

4. The pipe monitoring system of claim 1 wherein said groove extends substantially in the longitudinal direction.

5. The pipe monitoring system of claim 1 wherein said at least one groove further comprises a plurality of interconnected grooves.

6. The pipe monitoring system of claim 5 wherein said interconnected grooves further comprise a plurality of longitudinally extending grooves on a central portion of said linear means and grooves connected to said longitudinally extending groves at at least one end of said liner means.

7. The pipe monitoring system of claim 6 further comprising helically extending grooves provided at the opposite end of said liner and interconnected by said longitudinally extending grooves.

8. The pipe monitoring system of claim 1 further comprising a stiffener located inside said grooves.

9. The pipe monitoring system of claim 1 wherein said at least one groove further comprises a plurality of interconnected grooves and further comprising a plurality of shallow recesses located in the exterior surface of said liner means between said grooves.

10. The pipe monitoring system of claim 1 wherein said liner means is characterized by inner layer of a relatively flexible polymer.

11. The pipe monitoring system of claim 1 wherein said groove substantially defines a helix in said flexible liner means.

12. A pipeline monitoring system comprising a plurality of pipe sections continuous pipeline; a thermoplastic liner provided in each of said pipe section in substantially flush-mounted relationship with respect to the interior surface of said pipe sections, respectively; at least one groove provided in the exterior surface of said liner, wherein said groove and said interior wall of said pipe sections, respectively define at least one passageway; and leak detection means provided in communication with said passageway for detecting leakage into said passageway.

13. The pipeline monitoring system of claim 12 further comprising interconnection means for interconnecting said passageway of adjacent interconnected pipe sections to allow fluid communication therebetween.

14. The pipe monitoring system of claim 12 wherein said pipe sections are intended for high pressure applications and said groove is characterized by a cross-sectional shape selected from square, semi-circular, triangular and U-shaped designs.

15. The pipeline monitoring system of claim 12 wherein said pipe sections are intended for low pressure applications and said groove is characterized by a cross-sectional shape selected from trapezoidal and generally circular designs.

16. A pipeline monitoring system for detecting apertures in a pipeline comprising at least one thermoplastic liner disposed in the pipeline in substantially tight engagement with the interior wall of the pipeline; a plurality of interconnecting groves provided in the exterior surface of said liner in a selected pattern, whereby said grooves and the inside surface of the pipeline define interconnected passageways in said selected pattern; and leak detection means communicating with said passageways for detecting leakage of fluids into said passageways.

17. The pipeline monitoring system of claim 16 wherein said leak detection means further comprises a light-transmitting cable disposed along at least one of said grooves in said liner and means provided in cooperation with the light-transmitting cable for detecting changes in the intensity of light carried by said light-transmitting cable corresponding to beaches in the pipeline and liner.

18. The pipeline monitoring system of claim 16 wherein said leak detection means further comprises a vacuum pump and control means communicating with said vacuum pump for maintaining a substantially constant vacuum in said passageways and monitoring significant fluctuations of the pressure in said passageways, said at least one thermoplastic liner further comprises a plurality of thermoplastic liners disposed in the pipeline in end-to-end relationship and further comprising connecting means connecting said thermoplastic liners in the pipeline.

* * * * *